(12) United States Patent
Balasubramanian et al.

(10) Patent No.: US 9,690,732 B2
(45) Date of Patent: Jun. 27, 2017

(54) POWER-OVER-ETHERNET (POE)-ENABLED NETWORK DEVICE AND USB DEVICE POWER NEGOTIATION USING USB TO POE PROTOCOL CONVERSION

(71) Applicant: Cisco Technology, Inc., San Jose, CA (US)

(72) Inventors: Koussalya Balasubramanian, Santa Clara, CA (US); Rob Liston, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 14/558,131

(22) Filed: Dec. 2, 2014

(65) Prior Publication Data

US 2015/0331464 A1    Nov. 19, 2015

Related U.S. Application Data (60) Provisional application No. 61/994,205, filed on May 16, 2014.

(51) Int. Cl.
| | |
|---|---|
| G06F 1/00 | (2006.01) |
| G06F 13/38 | (2006.01) |
| G06F 1/26 | (2006.01) |
| G06F 13/42 | (2006.01) |
| H04L 12/10 | (2006.01) |
| H04L 29/06 | (2006.01) |

(52) U.S. Cl.
CPC .............. *G06F 13/387* (2013.01); *G06F 1/26* (2013.01); *G06F 1/266* (2013.01); *G06F 13/42* (2013.01); *G06F 13/4282* (2013.01); *H04L 12/10* (2013.01); *G06F 2213/0042* (2013.01); *H04L 69/08* (2013.01)

(58) Field of Classification Search
CPC ......... H04L 69/08; H04L 12/10; G06F 1/266; G06F 13/387; G06F 2213/0042; G06F 13/42

See application file for complete search history.

(56) References Cited

U.S. PATENT DOCUMENTS

| | | | |
|---|---|---|---|
| 7,966,502 | B2 | 6/2011 | Diab et al. |
| 8,661,268 | B2 | 2/2014 | Brooks et al. |
| 2001/0047441 | A1 | 11/2001 | Robertson |

(Continued)

OTHER PUBLICATIONS

Maheshwari, "Hula: An Efficient Protocol for Reliable Delivery of Messages", Technical Report MIT-LCS-TR-720, Jul. 1997, 9 pages.

*Primary Examiner* — Xuxing Chen
(74) *Attorney, Agent, or Firm* — Edell, Shapiro & Finnan, LLC

(57) ABSTRACT

A Network-Universal Serial Bus (NUSB) adaptor exchanges Power-over-Ethernet (PoE) packets with, and receives power from, a Power Source Equipment (PSE) over a PoE connection with the PSE, and exchanges Universal Serial Bus (USB) messages with, and provides power to, a USB device over a USB connection with the USB device. The NUSB adaptor converts between a USB power negotiation protocol implemented between the USB device and the NUSB adaptor and a PoE power negotiation protocol implemented between the NUSB adapter and the network device.

23 Claims, 7 Drawing Sheets

(56) References Cited

U.S. PATENT DOCUMENTS

| | | | |
|---|---|---|---|
| 2003/0172312 A1* | 9/2003 | Takahashi | G06F 1/266 |
| | | | 713/300 |
| 2007/0121832 A1* | 5/2007 | Ghoshal | H04L 12/10 |
| | | | 379/93.36 |
| 2007/0255868 A1* | 11/2007 | Chahal | G06F 13/387 |
| | | | 710/62 |
| 2009/0248918 A1 | 10/2009 | Diab et al. | |
| 2009/0265057 A1 | 10/2009 | Chinnadurai et al. | |
| 2010/0007473 A1 | 1/2010 | Fadell | |
| 2010/0030925 A1 | 2/2010 | Inoue | |
| 2010/0036992 A1* | 2/2010 | Sisto | G06F 13/387 |
| | | | 710/305 |
| 2013/0301301 A1* | 11/2013 | Fischer | H04L 12/413 |
| | | | 363/15 |
| 2015/0311753 A1* | 10/2015 | Scifres | H02J 13/0096 |
| | | | 713/300 |

\* cited by examiner

POWER-OVER-ETHERNET (POE)-ENABLED NETWORK DEVICE AND USB DEVICE POWER NEGOTIATION USING USB TO POE PROTOCOL CONVERSION

CROSS REFERENCE TO RELATED APPLICATION

This application claims priority to U.S. Provisional Application No. 61/994,205 filed May 16, 2014, the entirety of which is incorporated herein by reference.

TECHNICAL FIELD

The present disclosure relates to techniques to power Universal Serial Bus (USB) devices through Universal Serial Bus (USB) and Ethernet connections.

BACKGROUND

A Powered Device (PD) receives power from Power Source Equipment (PSE), such as a Power-over-Ethernet (PoE)-enabled network switch, over a Power-over-Ethernet (PoE) connection between the PD and the PSE. The PSE and PD may use a PoE power negotiation protocol to negotiate a power level that the PSE is to supply to the PD. A Universal Serial Bus (USB) device receives power from an external device over a USB connection between the USB device and the external device. The USB device and the external device may use a USB power negotiation protocol to establish a power level supplied to the USB device. The PoE and USB power negotiation protocols are incompatible with each other.

DESCRIPTION OF EXAMPLE EMBODIMENTS

Overview

Techniques presented herein relate to powering Universal Serial Bus (USB) devices through USB and Ethernet connections. A Network-USB (NUSB) adaptor (i) exchanges Power-over-Ethernet (PoE) packets with, and receives power from, a Power Source Equipment (PSE) over a PoE connection with the PSE, and (ii) exchanges Universal Serial Bus (USB) messages with, and provides power to, a USB device over a USB connection with the USB device. The NUSB adaptor receives a USB power request from the USB device that specifies a power-related parameter for use by the USB device and converts the received USB power request to a PoE power request that specifies the power-related parameter. The NUSB adaptor sends the PoE power request to the PSE. The NUSB receives a PoE response from the PSE that indicates acceptance of the sent PoE power request and converts the received PoE response to a USB response. The NUSB sends the USB response to the USB device.

Example Embodiments

Figure 1:
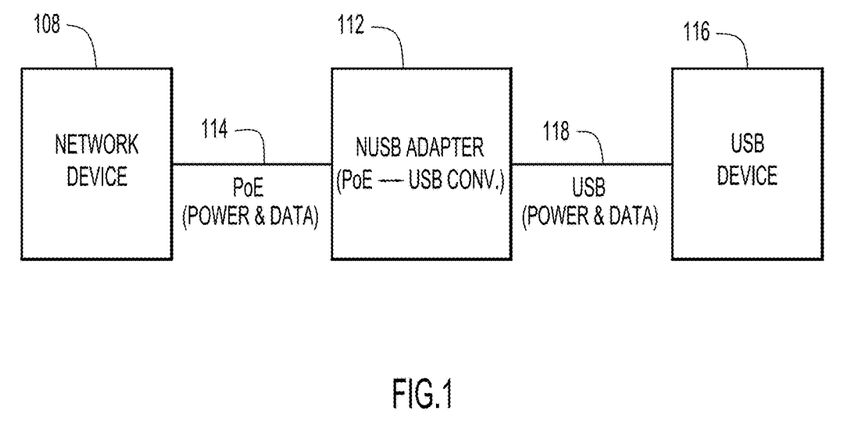
FIG. 1 is a diagram of an example communication system that enables power negotiation between a Power-over-Ethernet (PoE)-enabled network device and a Universal Serial Bus (USB) device, according to an example embodiment.

Referring first to FIG. 1, there is shown a diagram of an example communication system 100 that enables power negotiation between a Power-over-Ethernet (PoE) enabled network device and a Universal Serial Bus (USB) device. System 100 includes a PoE network device 108, such as a network switch or router, accessible through a communication network (not shown in FIG. 1), which may include one or more wide area networks (WANs), such as the Internet, and one or more local area networks (LANs). Network device 108 includes multiple PoE enabled network ports (not specifically shown in FIG. 1), one of which is connected to a Network-USB (NUSB) adaptor device 112 over a PoE connection 114. NUSB adaptor device 112 (referred to simply as NUSB adaptor 112) is in turn connected to a USB endpoint or device 116 over USB connection 118 (including standard USB cabling and connectors).

Network device 108 exchanges PoE (data) packets with NUSB adaptor 112 and also operates as a Power Source Equipment (PSE) to provide PoE power to the NUSB adaptor 112 over the PoE connection, for example, in accordance with the IEEE 802.3 standard extended/modified as described herein. NUSB adaptor 112 exchanges low level USB (data) messages with USB device 116 over USB connection 118, and also provides USB power to the USB device over the USB connection. USB device 116 and USB connection 118 are configured to operate in accordance with known and hereafter developed USB standards such as, but not limited to, USB 1.0, 2.x, and 3.x, and in accordance with modifications/extensions of the USB standards presented herein.

According to techniques presented herein, USB device 116 negotiates for power with network device 108 (operating as a PSE) through NUSB adaptor 112 and receives the negotiated power from the network device through the NUSB adaptor. At a high-level, NUSB adaptor 112 and USB device 116 perform power negotiation with each other over USB connection 118 using a USB power negotiation protocol that enables the USB device to request a required power level. In turn, network device 108 and NUSB adaptor 112 perform power negotiation with each other over PoE connection 114 using a PoE power negotiation protocol to enable the NUSB adaptor to request and then receive sufficient power from the network device to satisfy the power request from the USB device. The PoE and USB power negotiation protocols are not the same. Therefore, NUSB adaptor 112 converts or bridges between the PoE and USB power negotiation protocols. For example, NUSB adaptor 112 converts (i) messages from the USB to the PoE power negotiation protocol to convey power requests from USB device 116 to network device 108, and (ii) packets from the PoE to the USB power negotiation protocol to convey power request responses/acknowledgements from the network device to the USB device. In other words, NUSB adaptor 112 converts power negotiation-related USB messages to power negotiation-related PoE packets and vice versa.

Figure 2:
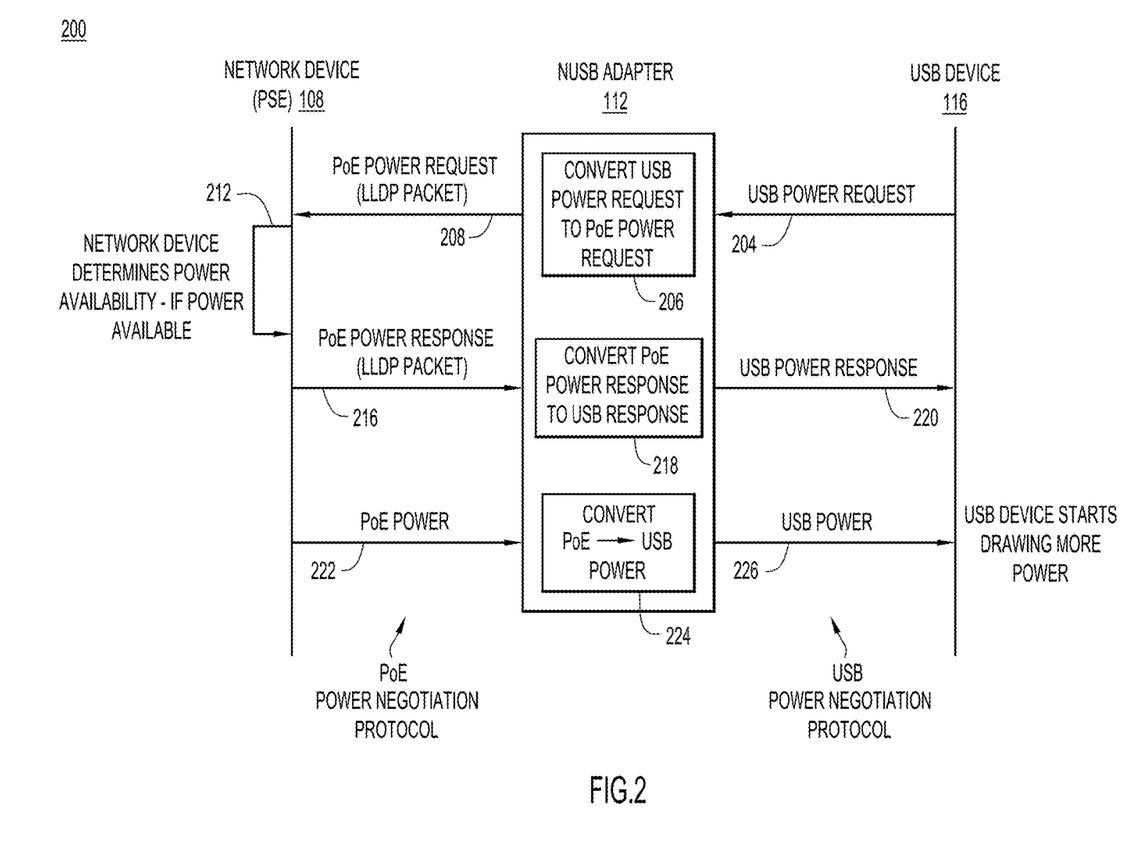
FIG. 2 is an illustration of an example power negotiation between the USB device and the network device through a Network-NUSB (NUSB) adaptor that converts between USB and PoE power negotiation protocols, according to an example embodiment.

With reference to FIG. 2, there is an illustration of an example power negotiation 200 between USB device 116 and network device 108 that uses NUSB adaptor 112 to convert between the USB and PoE power negotiation protocols. Power negotiation 200 is initiated by USB device 116. In the example of FIG. 2, the PoE power negotiation protocol is a Link Layer Data Protocol (LLDP) that exchanges LLDP packets over PoE connection 114, although other types of PoE power negotiation protocols may be used. LLDP implements various protocol timers not shown in FIG. 2.

At 204, USB device 116 sends a USB power request formatted as a USB message to NUSB adaptor 112 (and the NUSB adaptor receives the request) over USB connection 118 using the USB power negotiation protocol. The USB power request specifies a type of power-related parameter, e.g., voltage, current, or power, and a value of the power-related parameter, e.g., in Volts, Amps, or Watts.

At 206, NUSB adaptor 112 converts the USB power request to a PoE power request (e.g., an LLDP packet). The PoE power request incorporates the specified type and value of the power-related parameter from the USB power request.

At 208, NUSB adaptor 112 sends the PoE power request (e.g., the LLDP packet) to network device 108 over PoE connection 114 using the PoE power negotiation protocol (e.g., using LLDP).

At 212, network device 108 receives the PoE power request and determines power availability in the network device. If network device 108 has sufficient power available to satisfy the PoE power request, flow proceeds to 216.

At 216, responsive to the PoE request received and the determination made at 212, network device 108 sends a PoE power response or acknowledgement (e.g., an LLDP packet) to NUSB adaptor 112 over PoE connection 114 using the PoE power negotiation protocol (e.g., using LLDP), which is received at the NUSB adaptor. The PoE power response may include a value of the power-related parameter that matches the requested value in the PoE power request and USB power request.

At 218, NUSB adaptor 112 converts the PoE power response to a USB power response.

At 220, NUSB adaptor 112 sends the USB power response to USB device 116 over USB connection 118 using the USB power negotiation protocol.

At 222, network device 108 supplies the requested power-related parameter (e.g., voltage, current, or power) to NUSB adaptor 112 over PoE connection 114, which is received by the NUSB adaptor.

At 224, NUSB adaptor 112 converts the received PoE power to USB power suitable for USB device 116.

At 226, NUSB adaptor 112 provides the USB power to the USB device 116. In another embodiment, the power convert operation 224 in NUSB adaptor 112 may be omitted, in which case the NUSB simply passes the received PoE power directly to USB device 116 as is.

Figure 3:
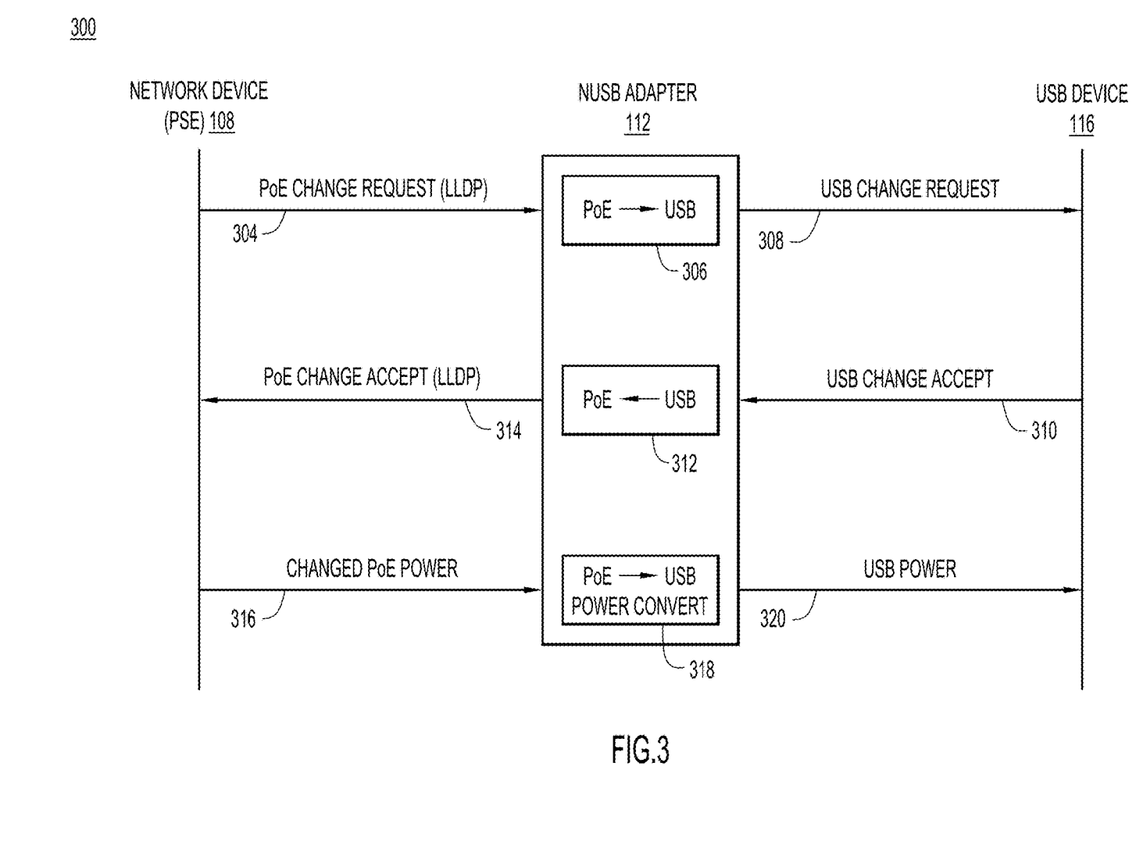
FIG. 3 is an illustration of another example power negotiation between the USB device and the network device through the NUSB adaptor, according to an example embodiment.

With reference to FIG. 3, there is an illustration of another example power negotiation 300 between USB device 116 and network device 108 that uses NUSB adaptor 112 to convert between the USB and PoE power negotiation protocols. Power negotiation 300 is initiated by network device 108.

At 304, network device 108 sends a PoE power change request/announcement (e.g., an LLDP packet) to NUSB adaptor 112 using the PoE power negotiation protocol (e.g., using LLDP). The PoE change request indicates that network device 108 wants to change its current power output to a different power output specified in the PoE power change request.

At 306, NUSB adaptor 112 converts the PoE power change request to a USB power change request.

At 308, NUSB adaptor 112 sends the USB power change request to USB device 116 using the USB power negotiation protocol.

At 310, USB device 116 sends a USB power change accept to NUSB adaptor 112 indicating that the USB device accepts the change using the USB power negotiation protocol.

At 312, NUSB adaptor 112 converts the USB power change accept to a PoE power change accept.

At 314, NUSB adaptor 112 sends the PoE power change accept to network device 108 using the PoE power negotiation protocol.

At 316, responsive to the PoE power change accept, network device 108 changes its PoE supply power and supplies the changed PoE supply power to NUSB adaptor 112.

At 318, NUSB adaptor 112 converts the changed PoE supply power to USB power.

At 320, NUSB adaptor 112 provides the USB power to USB device 116.

Figure 4:
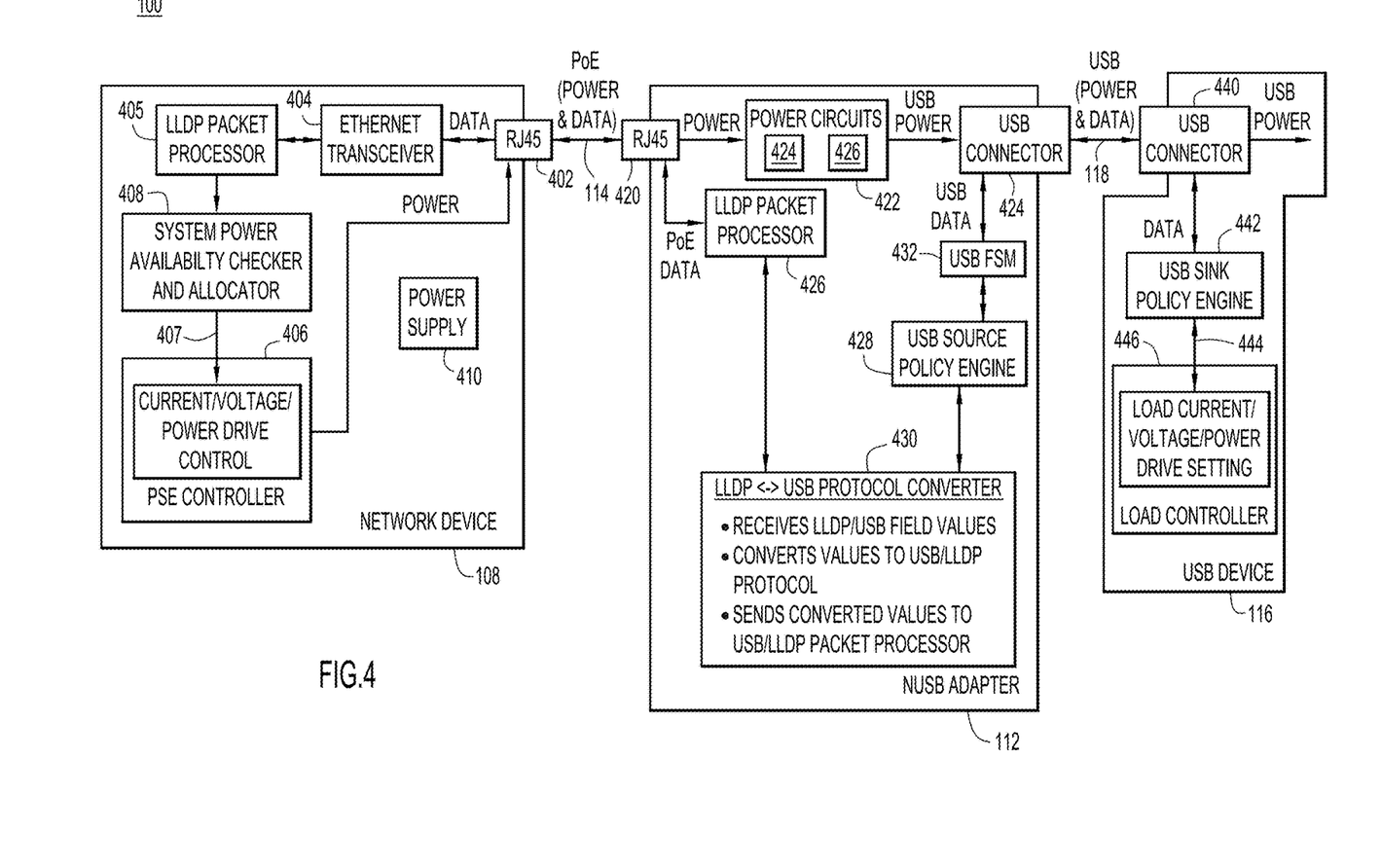
FIG. 4 is a block diagram showing details of the network device, the NUSB adaptor, and the USB device from FIG. 1, according to an example embodiment.

With reference to FIG. 4, there is a block diagram showing details of network device 108, NUSB adaptor 112, and USB device 116 in system 100, according to an embodiment. In the example of FIG. 4, the PoE power negotiation protocol uses LLDP; however, other PoE power negotiation protocols may be used.

Network device 108 includes a PoE network port 402, an Ethernet transmitter/receiver (transceiver) 404, an LLDP Packet Processor or logic 405, a PSE controller 406, a System Power Availability Checker and Allocator 408, and a power supply 410. PoE network port 402 to mate with an Ethernet cable of PoE connection 114 and carry PoE packets "Data" to/from the cable and provide "Power" to the PoE connection. Although only one network port is depicted in FIG. 4, network device 108 may include multiple network ports. Ethernet transmitter/receiver (transceiver) 404 transmits/receives PoE packets to/from network port 402.

LLDP Packet Processor or logic 405 interprets LLDP packets received from Ethernet transceiver 404 (e.g., PoE power request) and constructs LLDP packets (e.g., PoE power response and PoE power change request) and sends the constructed LLDP packets to the transceiver.

PSE controller 406 performs PSE operations, including, but not limited to, PoE Powered Device (PD) detection, optional classification, start-up, operation, and disconnect.

PSE controller 406 includes power drive circuits that control a power draw by a PD connected to network port 402 (e.g., NUSB adaptor 112). The power drive circuits change drive circuit settings based on a control signal 407 to correspondingly change a power, voltage, or current level provided to the PD.

System Power Availability Checker and Allocator 408 checks for/determine available un-utilized power in network device 108 and allocates the available un-utilized power to satisfy PoE power requests from NUSB adaptor 112. System Power Availability Checker and Allocator 408 also generates control signal 407 to control PSE controller 406.

Power supply 410 provides power for network device 108 and PoE power for NUSB adaptor 112 (and indirectly for USB device 116).

NUSB adaptor 112 operates as a PD to sink power from network device 108. NUSB adaptor 112 includes a PoE port 420, power circuits 422, a USB connector 424, an LLDP Packet Processor or logic 426, a USB Source Policy Engine or logic 428, an LLDP-to-USB Protocol Converter 430, and a USB Finite State Machine (FSM) 432.

PoE port 420 mates with the cable of PoE connection 114. Port 420 provides PoE power to NUSB circuits (described below) and carries PoE packets ("Data") to/from PoE connection 114.

Power circuits 422 include: a PD circuit 424 to perform PD operations including, for example, presenting to PSE controller 406 in network device 108 valid detection and classification signatures responsive to the PSE operations (e.g., detection, classification, and so on); and a power converter 426 (e.g., a Direct Current (DC)-to-DC converter) to convert PoE power (e.g., PoE voltage) to USB power (e.g., USB voltage) suitable for USB device 116. In an example, the DC-DC converter converts PoE-standard prescribed voltages to a standard 5 Volt USB voltage.

USB connector 424 mates with a USB cable of USB connection 118. Connector 424 provides USB power to the USB connection and carries USB messages to/from the USB connection.

LLDP Packet Processor or logic 426 interprets LLDP packets received from PoE connection 118 (e.g., PoE power response or PoE power change request), constructs LLDP packets (e.g., PoE power request and PoE power change accept), and sends the constructed LLDP packets to the PoE connection.

USB Source Policy Engine or logic 428 receives and handles (i) USB power requests and USB power change responses from USB device 116, and (ii) USB power responses and USB change requests destined for the USB device.

LLDP-to-USB Protocol Converter 430 converts between USB and LLDP packets, e.g., from LLDP packets to corresponding USB messages and vice versa.

USB Finite State Machine (FSM) 432, coupled between USB connector 424 and USB Source Policy Engine 428, transmits/receives bus-level USB transaction sequences over USB connection 118 so as to comply with tight timing requirements imposed thereon and in accordance with USB standards. USB FSM 432 generates bus-level USB transaction sequences to be transmitted to USB device 116 based on data from USB Source Policy Engine 428, and converts bus-level USB transaction sequences from the USB device into data that can be interpreted by the USB Source Policy Engine. Bus-level USB transaction sequences include token, data, handshake, and special messages exchanged over the USB connection, as is known. In accordance with techniques described herein, the USB transaction sequences are extended to also include the USB power request, USB power request response, USB power change request, and USB power change response messages mentioned above.

USB device 116 includes a USB connector 440 to mate with the USB cable of USB connection 118. USB device 116 also includes a USB Sink Policy Engine 442 to generate USB power requests based on circuit load demand in the USB device, and sends control signals 444 to a USB Load Controller 446 whenever circuit load power/voltage/current levels need to be changed. Engine 442 also generates USB power request responses and USB power change responses, and handles USB power change requests. USB Load Controller 446 controls how much current is drawn by circuit loads in USB device 116 at any given time.

Figure 5:
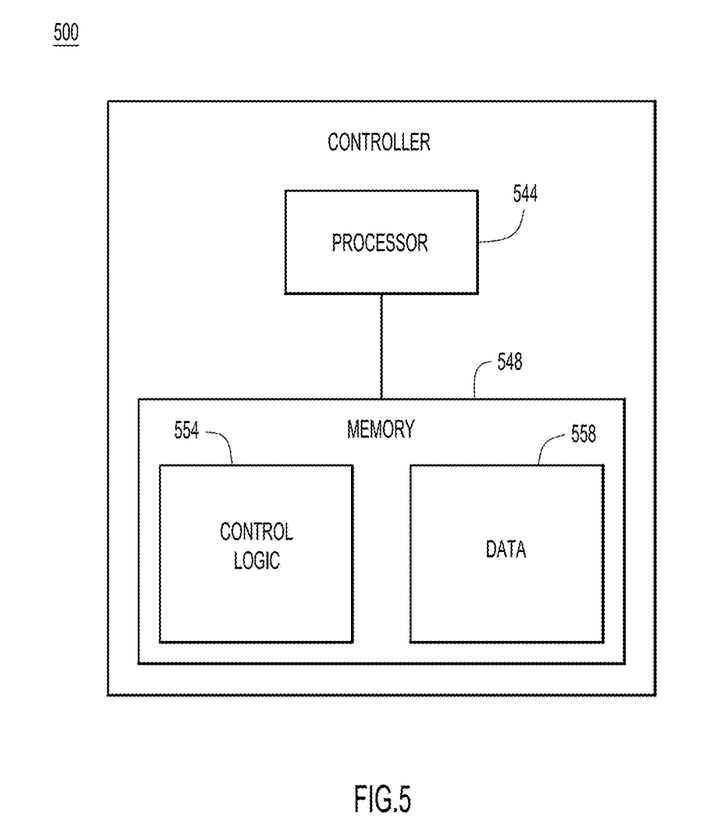
FIG. 5 is a block diagram of an example generalized controller that may be implemented in the network device, the NUSB adaptor, and the USB device to perform respective operations to implement techniques described herein, according to an example embodiment.

With reference to FIG. 5, there is a block diagram of an example generalized controller 500 that may be implemented in network device 108, NUSB adaptor 112, and USB device 116 to perform respective operations to implement techniques described herein. There are numerous possible configurations for controller 500 and FIG. 5 is meant to be an example. Controller 500 includes a processor 544 and memory 548. The processor 544 is a microcontroller or microprocessor, for example, configured to execute software instructions stored in the memory 548.

The memory 548 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 548 may comprise one or more computer readable storage media (e.g., a memory device) encoded with software comprising computer executable instructions and when the software is executed (by the processor 544) it is operable to perform the operations described herein. For example, the memory 548 stores or is encoded with instructions for Control logic 554 to perform the operations/functions related to power negotiation between USB device 116 and network device 108, using NUSB adaptor 112 as an intermediary. In addition, the memory 548 stores data 558 generated and used by processor 544 when executing logic 554.

When controller 500 is implemented in network device 108, logic 554 may include LLDP Packet Processor or logic 405 and System Power Availability Checker and Allocator 408.

When controller 500 is implemented in NUSB adaptor 112, logic 554 may include LLDP Packet Processor or logic 426, USB Source Policy Engine 428, and LLDP-to-USB Protocol Converter 430.

When controller 500 is implemented in USB device 112, logic 554 may include USB Sink Policy Engine 442.

Figure 6:
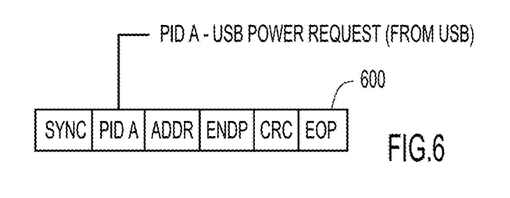
FIG. 6 is an illustration of an example USB message format for a USB power request, according to an example embodiment.

With reference to FIG. 6, there is an illustration of an example USB message format 600 for a USB power request. The USB message format 600 includes a packet/message identifier (PID) field that is set to "A" to indicate the message is a USB power request, where A represents a PID value not currently in use for standard token, handshake, data, and special USB messages. USB message format 600 also includes SYNC, ADDR (address), ENDP (endpoint), CRC (cyclic redundancy check), and EOP (end of packet) fields.

Figure 7:
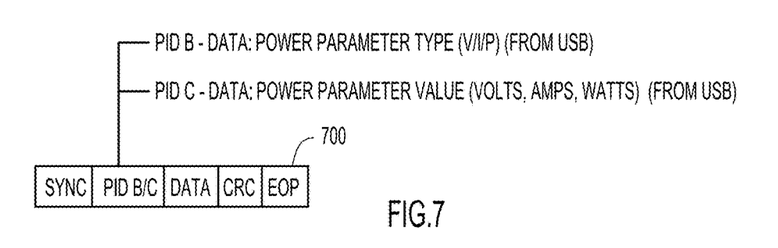
FIG. 7 is an illustration of an example USB message format for a USB data message accompanying a USB power request, according to an example embodiment.

With reference to FIG. 7, there is an illustration of an example USB message format 700 for a USB data message accompanying a USB power request. USB message format 700 includes a packet identifier (PID) field that may be set to (i) "B" to indicate the Data to follow is a power-related parameter type, e.g., V=Voltage, I=Current, or P=Power, or (ii) "C" to indicate the Data to follow is a power-related parameter value, e.g., Volts, Amps (A), or Watts (W), where B and C represent PID values not currently in use.

Figure 8:
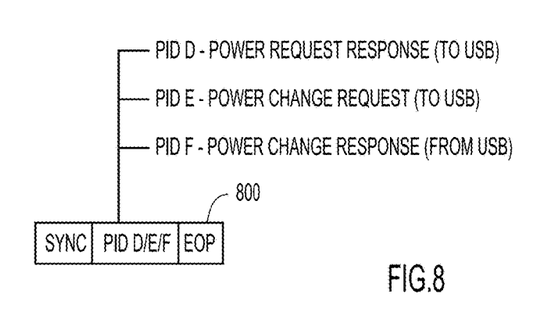
FIG. 8 is an illustration of an example USB message format for a USB power request response, a USB power change request, and a USB power change response, according to an example embodiment.

With reference to FIG. 8, there is an illustration of an example USB message format 800 for a USB power request response (PID="D"), a USB power change request (PID="E"), or a USB power change response (PID="F"), where D, E, and F represent PID values not currently in use.

Figure 9:
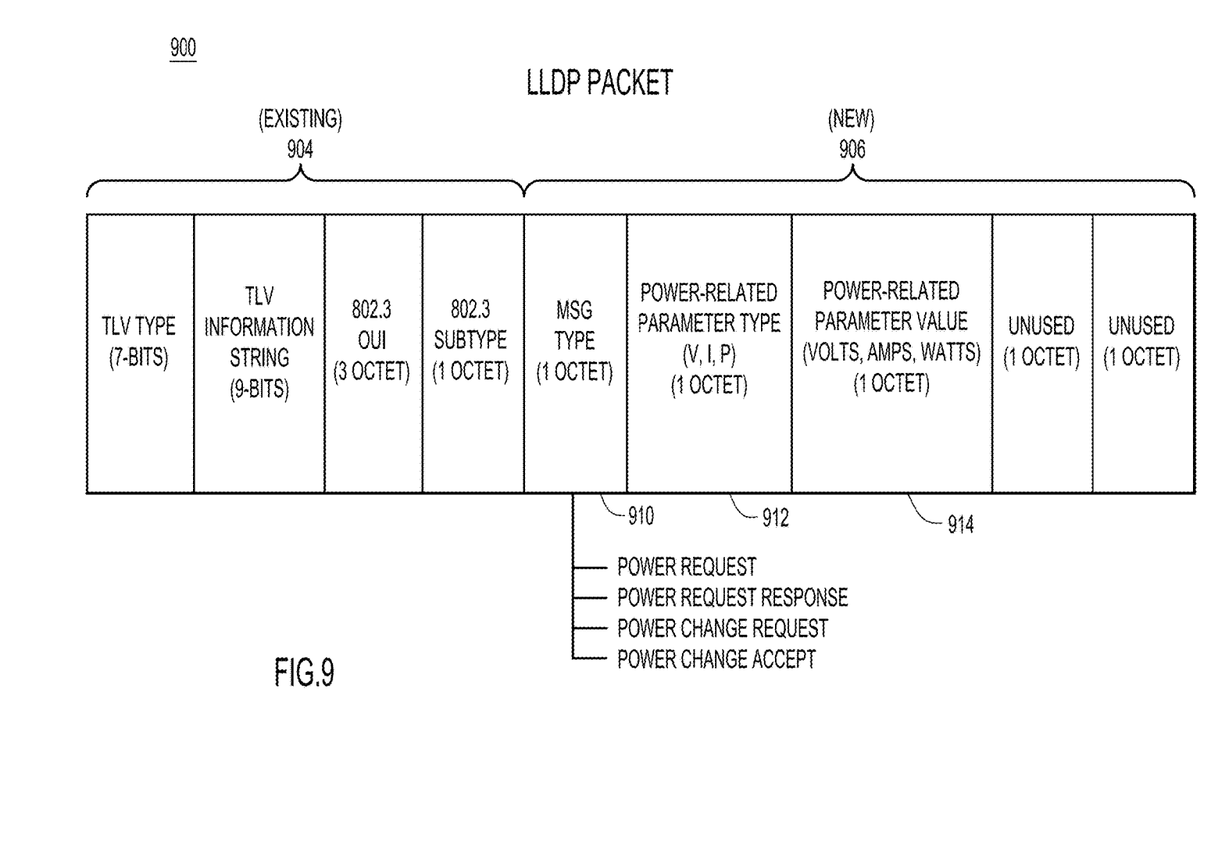
FIG. 9 is an illustration of an example Link Layer Data Protocol (LLDP) packet format for LLDP packets that may be exchanged between the network device and the NUSB adaptor over a PoE connection during power negotiations.

With reference to FIG. 9, there is an illustration of an example LLDP packet format 900 for LLDP packets that may be exchanged over PoE connection 114 in power negotiations 200 and 300. LLDP packet format 900 includes a set of fields 904 defined in accordance with the existing IEEE 802.3 standard and new fields 906 that modify or extend the standard in accordance with the techniques presented herein. A new field 910 specifies a packet type, e.g., PoE power request, PoE power response, PoE power change request, or PoE power change accept. A new field 912 specifies a type of power-related parameter, e.g., V (volts), I (current), or P (power). A new field 914 specifies a value of the specified power related parameter type, e.g., Volts, Amps, or Watts.

In summary, in one form, a method is provided comprising: at a Network-Universal Serial Bus (NUSB) adaptor to (i) exchange Power-over-Ethernet (PoE) packets with, and receive power from, a Power Source Equipment (PSE) over a PoE connection with the PSE, and (ii) exchange Universal Serial Bus (USB) messages with, and provide power to, a USB device over a USB connection with the USB device: receiving a USB power request from the USB device that specifies a power-related parameter for use by the USB device; converting the received USB power request to a PoE power request that specifies the power-related parameter; sending the PoE power request to the PSE; receiving a PoE response from the PSE that indicates acceptance of the sent PoE power request; converting the received PoE response to a USB response; and sending the USB response to the USB device.

In another form, an apparatus is provided comprising: a PoE interface to connect with a Power Source Equipment over a PoE connection; a USB interface to connect with a USB device over a USB connection; a controller coupled to the PoE and USB interfaces, to: receive a USB power request from the USB device that specifies a power-related parameter for use by the USB device; convert the received USB power request to a PoE power request that specifies the power-related parameter; send the PoE power request to the PSE; receive a PoE response from the PSE that indicates acceptance of the sent PoE power request; convert the received PSE response to a USB response that indicates the acceptance; and send the USB response to the USB device.

In yet another form, a system is provided comprising: a power source equipment (PSE); a Universal Serial Bus (USB) device; and a Network-USB (NUSB) adaptor to connect with the PSE over a PoE connection and with the USB device over a USB connection, wherein: the NUSB adaptor and the USB exchange USB messages with each other over the USB connection using a USB power negotiation protocol; the NUSB adaptor and PSE exchange PoE packets with each other over the PoE connection using a PoE power negotiation protocol; the NUSB adaptor converts (i) messages from the USB to the PoE power negotiation protocol to convey a power request from the USB device to the PSE, and (ii) packets from the PoE to the USB power negotiation protocol to convey a power request acknowledgement from the PSE to the USB device; the PSE provides power to the NUSB adaptor responsive to the power request; and the NUSB adaptor forwards the power received from the PSE to the USB device.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a Network-Universal Serial Bus (NUSB) adaptor to exchange (i) Power-over-Ethernet (PoE) packets with, and receive power from, a Power Source Equipment (PSE) over a PoE connection with the PSE, and (ii) Universal Serial Bus (USB) messages with, and provide power to, a USB device over a USB connection with the USB device:
   receiving a USB power request from the USB device that specifies a power-related parameter for use by the USB device;
   converting the received USB power request to a PoE power request that specifies the power-related parameter;
   sending the PoE power request to the PSE;
   receiving a PoE response from the PSE that indicates acceptance of the sent PoE power request;
   converting the received PoE response to a USB response; and
   sending the USB response to the USB device.

2. The method of claim 1, further comprising, at the NUSB adaptor:
   receiving the specified power-related parameter from the PSE; and
   providing the received specified power-related parameter to the USB over the USB connection.

3. The method of claim 2, wherein the specified power-related parameter is a power level or a voltage level.

4. The method of claim 1, wherein:
   the converting the received USB power request includes converting the received USB power request to one or more Link Layer Data Protocol (LLDP) power request packets; and
   the sending the PoE power request includes sending the one or more LLDP power request packets to the PSE using the LLDP.

5. The method of claim 4, wherein the USB power request includes one or more USB messages including a USB message identifier (PID) to indicate a power request and a type of power-related parameter, an address of the USB device, and a value of the specified power-related parameter.

6. The method of claim 4, wherein:
   the receiving a PoE response includes receiving the PoE response as an LLDP response packet; and
   the converting the received PSE response includes converting the received LLDP response packet to the USB response.

7. The method of claim 1, further comprising, at the NUSB:
   receiving a PoE power change request from the PSE;
   converting the received PoE power change request to a USB power change request; and
   sending the USB power change request from the NUSB to the USB device.

8. The method of claim 7, further comprising, at the NUSB:

receiving a USB power change accept from the USB device;
converting the USB power change accept to a PoE power change accept; and
sending the PoE power change accept to the PSE.

9. The method of claim 8, further comprising, at the NUSB:
receiving a change in power level from the PSE; and
forwarding the changed power level to the USB device.

10. An apparatus comprising:
a PoE interface to connect with a Power Source Equipment over a PoE connection;
a USB interface to connect with a USB device over a USB connection;
a controller coupled to the PoE and USB interfaces, to:
receive a USB power request from the USB device that specifies a power-related parameter for use by the USB device;
convert the received USB power request to a PoE power request that specifies the power-related parameter;
send the PoE power request to the PSE;
receive a PoE response from the PSE that indicates acceptance of the sent PoE power request;
convert the received PSE response to a USB response that indicates the acceptance; and
send the USB response to the USB device.

11. The apparatus of claim 10, further comprising power circuitry, to:
receive the specified power-related parameter from the from the PSE through the PoE interface; and
provide the received specified power-related parameter to the USB over the USB connection.

12. The apparatus of claim 11, wherein the specified power-related parameter is a power level or a voltage level.

13. The apparatus of claim 10, wherein the controller:
converts the received USB power request by converting the received USB power request to one or more Link Layer Data Protocol (LLDP) power request packets; and
sends the PoE power request by sending the one or more LLDP power request packets to the PSE using the LLDP.

14. The apparatus of claim 13, wherein the USB power request includes one or more USB messages including a USB message identifier (PID) to indicate a power request and a type of power-related parameter, an address of the USB device, and a value of the specified power-related parameter.

15. The apparatus of claim 13, wherein the controller:
receives a PoE response by receiving the PoE response as an LLDP response packet; and
converts the received PSE response by converting the received LLDP response packet to the USB response.

16. The apparatus of claim 10, wherein the controller further:
receives a PoE power change request from the PSE;
converts the PoE power change request to a USB power change request; and
sends the USB power change request from the NUSB adaptor to the USB device.

17. The apparatus of claim 16, wherein the controller further:
receives a USB power change accept from the USB device;
converts the USB power change accept to a PoE power change accept; and
sends the PoE power change accept to the PSE.

18. The apparatus of claim 17, further comprising power circuitry to:
receive a change in power level from the PSE after the PoE power change accept has been sent by the controller; and
forward the change in power level to the USB device.

19. A system comprising:
a power source equipment (PSE);
a Universal Serial Bus (USB) device; and
a Network-USB (NUSB) adaptor to connect with the PSE over a PoE connection and with the USB device over a USB connection, wherein:
the NUSB adaptor and the USB exchange USB messages with each other over the USB connection using a USB power negotiation protocol;
the NUSB adaptor and PSE exchange PoE packets with each other over the PoE connection using a PoE power negotiation protocol;
the NUSB adaptor converts (i) messages from the USB to the PoE power negotiation protocol to convey a power request from the USB device to the PSE, and (ii) packets from the PoE to the USB power negotiation protocol to convey a power request acknowledgement from the PSE to the USB device;
the PSE provides power to the NUSB adaptor responsive to the power request; and
the NUSB adaptor forwards the power received from the PSE to the USB device.

20. The system of claim 19, wherein:
the USB device sends a USB power request representative of the power request to the NUSB adaptor using the USB power negotiation protocol;
the NUSB adaptor converts the USB power request to a PoE power request; and
the NUSB adaptor sends the PoE power request to the PSE using the PoE power negotiation protocol.

21. The system of claim 20, wherein:
the PSE sends power to the NUSB adaptor responsive to the PoE power request; and
the NUSB adaptor includes power circuitry to receive the power from the PSE and forward the power to the USB device.

22. The system of claim 20, wherein the PoE power negotiation protocol is based on a Link Layer Data Protocol (LLDP) and the NUSB adaptor converts the USB power request to an LLDP formatted power request, and sends the LLDP formatted power request to the PSE using the LLDP.

23. The system of claim 19, wherein:
the NUSB adaptor further converts (iii) packets from the PoE to the USB power negotiation protocol to convey a power change request from the PSE device to the USB device, and (iv) messages from the USB to the PoE power negotiation protocol to convey a power change accept from the USB device to the PSE;
the PSE provides a change in power to the NUSB adaptor responsive to the power change accept from the USB device; and
the NUSB adaptor forwards the changed power received from the PSE to the USB device.

* * * * *